(12) United States Patent
Roth (10) Patent No.: US 7,714,824 B2
(45) Date of Patent: May 11, 2010

(54) MULTI-PRIMARY DISPLAY WITH SPECTRALLY ADAPTED BACK-ILLUMINATION

(75) Inventor: Shmuel Roth, Petach Tikva (IL)

(73) Assignee: Genoa Color Technologies Ltd., Hod Hasharon (IL)

( * ) Notice: Subject to any disclaimer, the term of this patent is extended or adjusted under 35 U.S.C. 154(b) by 1220 days.

(21) Appl. No.: 10/555,781

(22) PCT Filed: May 24, 2004

(86) PCT No.: PCT/IL2004/000446

§ 371 (c)(1),
(2), (4) Date: Nov. 7, 2005

(87) PCT Pub. No.: WO2004/107025

PCT Pub. Date: Dec. 9, 2004

(65) Prior Publication Data

US 2007/0001994 A1    Jan. 4, 2007

Related U.S. Application Data (63) Continuation-in-part of application No. 10/480,280, filed as application No. PCT/IL02/00452 on Jun. 11, 2002, now Pat. No. 7,268,757.

(60) Provisional application No. 60/473,135, filed on May 27, 2003, provisional application No. 60/296,767, filed on Jun. 11, 2001, provisional application No. 60/318,626, filed on Sep. 13, 2001, provisional application No. 60/371,419, filed on Apr. 11, 2002.

(51) Int. Cl.
*G09G 3/36* (2006.01)

(52) U.S. Cl. ...................................................... 345/88

(58) Field of Classification Search ........... 345/3.1–3.3, 345/77, 87–90, 204, 589–603, 690, 694–699, 345/102, 4, 32; 348/743–744; 353/31, 84–86
See application file for complete search history.

(56) References Cited

U.S. PATENT DOCUMENTS 3,699,244 A     10/1972    Cohen et al.

(Continued)

FOREIGN PATENT DOCUMENTS

EP          0367848          5/1990

(Continued)

OTHER PUBLICATIONS

U.S. Appl. No. 09/710,895, filed Nov. 14, 2000, Ben David et al.

(Continued)

*Primary Examiner*—Sumati Lefkowitz
*Assistant Examiner*—Rodney Amadiz
(74) *Attorney, Agent, or Firm*—Pearl Cohen Zedek Latzer, LLP (57) ABSTRACT

Some embodiments of the invention provide a device, system and method for displaying a color image. According to some exemplary embodiments of the invention a device for displaying a color image may include an illumination source including a plurality of light-producing elements able to produce light of each of m different wavelength spectra, wherein m is equal to or greater than three. The device may also include an array of attenuating elements able to spatially selectively attenuate the light produced by the illumination source according to an attenuation pattern corresponding to a gray-level representation of the color image, and an array of color sub-pixel filter elements able to receive selectively attenuated light from the array of attenuating elements, each sub-pixel filter element able to transmit light of one of n different primary colors, wherein n is equal to or greater than four.

28 Claims, 9 Drawing Sheets

U.S. PATENT DOCUMENTS

| | | | |
|---|---|---|---|
| 4,390,893 A | | 6/1983 | Russell et al. |
| 4,751,535 A | | 6/1988 | Myers |
| 4,772,885 A | * | 9/1988 | Uehara et al. .................. 349/71 |
| 4,800,375 A | | 1/1989 | Silverstein et al. |
| 4,843,381 A | | 6/1989 | Baron |
| 4,843,573 A | | 6/1989 | Taylor et al. |
| 4,892,391 A | | 1/1990 | Stewart et al. |
| 4,952,972 A | | 8/1990 | Someya |
| 4,985,853 A | | 1/1991 | Taylor et al. |
| 4,994,901 A | | 2/1991 | Parulski et al. |
| 5,042,921 A | | 8/1991 | Sato et al. |
| 5,087,610 A | | 2/1992 | Hed |
| 5,184,114 A | | 2/1993 | Brown |
| 5,191,450 A | | 3/1993 | Yajima et al. |
| 5,214,418 A | | 5/1993 | Fukumura et al. |
| 5,233,183 A | | 8/1993 | Field |
| 5,233,385 A | | 8/1993 | Sampsell |
| 5,243,414 A | | 9/1993 | Dalrymole et al. |
| 5,416,890 A | | 5/1995 | Beretta |
| 5,447,811 A | | 9/1995 | Buhr et al. |
| 5,455,600 A | | 10/1995 | Friedman et al. |
| 5,563,621 A | | 10/1996 | Silsby |
| 5,587,819 A | * | 12/1996 | Sunohara et al. ............ 349/106 |
| 5,592,188 A | | 1/1997 | Doherty et al. |
| 5,614,925 A | | 3/1997 | Braudaway et al. |
| 5,631,734 A | | 5/1997 | Stern et al. |
| 5,642,176 A | | 6/1997 | Abukawa et al. |
| 5,650,942 A | | 7/1997 | Granger |
| 5,657,036 A | | 8/1997 | Markandey et al. |
| 5,724,062 A | | 3/1998 | Hunter |
| 5,736,754 A | | 4/1998 | Shi et al. |
| 5,740,334 A | | 4/1998 | Lin et al. |
| 5,751,385 A | | 5/1998 | Heinze |
| 5,835,099 A | | 11/1998 | Marimont |
| 5,841,494 A | | 11/1998 | Hall |
| 5,844,540 A | | 12/1998 | Terasaki |
| 5,844,699 A | | 12/1998 | Usami et al. |
| 5,863,125 A | | 1/1999 | Doany |
| 5,870,530 A | | 2/1999 | Balasubramanian |
| 5,872,898 A | | 2/1999 | Mahy |
| 5,892,891 A | | 4/1999 | Dalal et al. |
| 5,909,227 A | | 6/1999 | Silverbrook |
| 5,929,843 A | * | 7/1999 | Tanioka ...................... 345/600 |
| 5,982,347 A | | 11/1999 | Shigeta et al. |
| 5,982,541 A | | 11/1999 | Li et al. |
| 5,999,153 A | | 12/1999 | Lind et al. |
| 6,018,237 A | | 1/2000 | Havel |
| 6,058,207 A | | 5/2000 | Tuijn et al. |
| 6,069,601 A | | 5/2000 | Lind et al. |
| 6,072,445 A | * | 6/2000 | Spitzer et al. .................. 345/8 |
| 6,072,464 A | | 6/2000 | Ozeki |
| 6,097,367 A | | 8/2000 | Kuriwaki et al. |
| 6,144,420 A | | 11/2000 | Jung |
| 6,147,720 A | | 11/2000 | Guerinot et al. |
| 6,191,826 B1 | * | 2/2001 | Murakami et al. .......... 348/744 |
| 6,198,512 B1 | | 3/2001 | Harris |
| 6,220,710 B1 | | 4/2001 | Raj et al. |
| 6,231,190 B1 | | 5/2001 | Dewald |
| 6,236,390 B1 | | 5/2001 | Hitchcock |
| 6,236,406 B1 | | 5/2001 | Li |
| 6,239,783 B1 | | 5/2001 | Hill et al. |
| 6,246,396 B1 | | 6/2001 | Gibson et al. |
| 6,256,073 B1 | | 7/2001 | Pettitt |
| 6,259,430 B1 | | 7/2001 | Riddle et al. |
| 6,262,710 B1 | | 7/2001 | Smith |
| 6,262,744 B1 | | 7/2001 | Carrein |
| 6,280,034 B1 | | 8/2001 | Brennesholtz |
| 6,304,237 B1 | | 10/2001 | Karakawa |
| 6,324,006 B1 | | 11/2001 | Morgan |
| 6,366,291 B1 | | 4/2002 | Taniguchi et al. |
| 6,380,961 B1 | | 4/2002 | Van Der Loop et al. |
| 6,388,648 B1 | | 5/2002 | Clifton et al. |
| 6,407,766 B1 | | 6/2002 | Ramanujan et al. |
| 6,456,301 B1 | | 9/2002 | Huang |
| 6,459,425 B1 | | 10/2002 | Holub et al. |
| 6,467,910 B1 | | 10/2002 | Sato |
| 6,538,742 B1 | | 3/2003 | Ohsawa |
| 6,570,584 B1 | | 5/2003 | Cok et al. |
| 6,580,482 B1 | | 6/2003 | Hiji et al. |
| 6,594,387 B1 | | 7/2003 | Pettitt et al. |
| 6,633,302 B1 | | 10/2003 | Ohsawa |
| 6,750,992 B1 | | 6/2004 | Holub |
| 6,870,523 B1 | | 3/2005 | Ben-David et al. |
| 6,972,736 B1 | | 12/2005 | Wada et al. |
| 7,129,955 B2 | | 10/2006 | Motomura |
| 2001/0035853 A1 | * | 11/2001 | Hoelen et al. ............... 345/102 |
| 2002/0005829 A1 | | 1/2002 | Ouchi |
| 2002/0122019 A1 | | 9/2002 | Baba et al. |
| 2002/0149546 A1 | | 10/2002 | Ben-Chorin et al. |
| 2002/0163526 A1 | | 11/2002 | Haseltine et al. |
| 2002/0167528 A1 | | 11/2002 | Edge |
| 2002/0186229 A1 | | 12/2002 | Elliott |
| 2003/0085906 A1 | | 5/2003 | Elliott et al. |
| 2007/0001994 A1 | | 1/2007 | Roth |

FOREIGN PATENT DOCUMENTS

| | | |
|---|---|---|
| EP | 0547603 | 6/1993 |
| EP | 0653879 | 5/1995 |
| JP | 59 159131 | 9/1984 |
| JP | 60 263122 | 12/1985 |
| JP | 62 222774 | 9/1987 |
| JP | 03-092888 | 4/1991 |
| JP | 07043658 | 2/1995 |
| JP | 08-248410 | 9/1996 |
| JP | 09-251160 | 9/1997 |
| JP | 10-307205 | 11/1998 |
| JP | 2000253263 | 9/2000 |
| JP | 2000338950 | 12/2000 |
| WO | WO 95/10160 | 4/1995 |
| WO | WO 97/35424 | 9/1997 |
| WO | WO 97/42770 | 11/1997 |
| WO | WO 01/95544 | 12/2001 |
| WO | WO 02/11112 | 2/2002 |
| WO | WO 02/50763 | 6/2002 |
| WO | WO 02/091299 | 11/2002 |
| WO | WO 02/091348 | 11/2002 |
| WO | WO 02/091349 | 11/2002 |
| WO | WO 02/099557 | 12/2002 |
| WO | WO 02/101644 | 12/2002 |
| WO | WO 03/058587 | 7/2003 |
| WO | WO 03/088203 | 10/2003 |

OTHER PUBLICATIONS

International Search Report of Application PCT/IL05/00507 Dated Sep. 11, 2003.

Supplementary European Search Report for EP 03706857 Date: Sep. 20, 2006.

Mashairo Yamaguchi, Taishi Terji, Kenro Ohsawa, Toshio Uchiyama, Hideto Motomuro, Yuri Murakami and Nagaaki Ohyama "Color image reproduction based on the multispectral and multiprimary imaging: Experimental evaluation", Device Independent Color, Color Hardcopy and applications VII, Proc SPIE, vol. 4663, pp. 15-26 (2002).

Yamada et al., "12.1: LED Backlight for LCDs", IBM Research, Tokyo Research Laboratory, Yamato, Japan, 1998, SID, pp. 1-4.

Keith Jack, Video Demystified, 3$^{rd}$ Edition, LLH Technology Publishing 2001, pp. 215-219.

Sugiura, T, "11.4: Invited Paper:" EBU color Filter for LCDs, Toppan Printing CO., Japan, SID, 2001, pp. 146-149.

Horbie et al., "High Efficiency and high Visual Quality LCD Backlighting System", Faculty of Science and Technology, Kelo University, Japan, pp. 1-4.

International Search Report from PCT/IL02/00452, mailed on Dec. 9, 2002.

International Search Report from PCT/IL03/00020.

Supplementary European Search Report for EP 02 73 3203 Date: Sep. 25, 2005.

Supplementary European Search Report for EP 04 01 1262 Date: Oct. 17, 2005.

Ken-ichi Takatori, Hiroshi Imai, Hideki Asada and Masao Imai "Field-Sequential Smectic LCD with TFT Pixel Amplifier", Functional Devices Research Labs, NEC Corp., Kawasaki, Kanagawa 216-8555, Japan, SID 01 Digest.

"A critical view of Spectral Models Applied to Binary Color Printing", Wyble and Berns, Color Research and Application, vol. 25, 2000, pp. 4-19.

Jeffrey A. Shimizu, "Scrolling Color LCOS for HDTV Rear Projection", SID 01 Digest, pp. 1072-1075.

Francisco H. Imai, Color Science; "Spectral reproduction from scene to hardcopy", Part 1-Multi-spectral acquisition ans spectral estimation using a Trichromatic Digital Camera System associated with absorbtion filters.

Rosen et al., "Spectral Reproduction from Scene to Hardcopy II", Image Processing. Munsell Color Science Laboratory, RIT-Proceedings of SPIE vol. 4300 (2001).

Pointer, M. R., "The Gamut of Real Surface Colors", Color Research & Appl. 5(3): 145-155, 1980.

Ajito et al., Expanded Color Gamut Reproduced by Six-Primary Projection Display, Proc. SPIE, vol. 2954 (2000) pp. 130-137.

Ajito et al., "Multiprimary Color Display for Liquid Crystal Display Projectors Using Diffraction Granting", Optical Eng. 38(11) 1883-1888 (Nov. 1999).

Ajito et al., "Color Conversion Method for Multiprimary Display Using Matrix Switching", Optical Review, vol. 9, No. 3 (Dec. 2001), 191-197.

Klompenhouwer et al., "13.4: Subpixel Image Scaling for Color Matrix Displays", Phillips Research Laboratories, Einhoven, The Netherlands, 2002, SID, pp. 176-179.

Credelle et al., "9-2: MTF of High-Resolution Pen Tile Matrix Displays", Eurodisplay 2002, pp. 159-162.

Gunter Wyszecki and W.S. Stiles, Color Science: Concepts and methods, Quantative Data and Formulae, 2d Ed., 1982, pp. 179-183.

Elliott et al., "13.3: Co-Optimization of Color AMLCD Subpixel Architecture and Rendering Algorithms", ClairVoyante Laboratories, USA and AMLCD, Semiconductor Business, Korea, pp. 1-4.

Elliott, C., "Active Matrix Display Layout Optimization for Sub-pixel Image Rendering", ClairVoyante Laboratories, USA, pp. 1-5.

Betrisey et al., "20.4: Displaced Filtering for Patterned Displays", Microsoft Corporation, Society for Information Display, 2000, SID, pp. 1-4.

Daly, Scott, "47.3: Analysis of Subtriad Addressing Algorithms by Visoal System Models" Center for Displayed Appearance, Sharp Laboratories of America, Camas, WA, USA, 2001, SID, pp. 1200-1203.

Platt, J., "Optimal Filtering for Patterned Displays", Microsoft Research, pp. 1-4.

Hiyama et al., "LN-3: Four-Primary Color 15-in. XGA TFT-LCD with Wide Color Gamut", Japan, Eurodisplay 2002, pp. 827-830.

Sugiura et al., "P-24: LCD Module Adopting a Color Conversion Circuit", Japan, SID, 2002, pp. 288-291.

Search Report from PCT/IL03/00307, mailed on Sep. 11, 2003.

"Parameter Values for the HDTV Standards for Production and International Programme Exchange" Rec. ITU-R BT 709-3 (1990-1994-1995-1996), pp. 1-28.

"High performance LCD backlighting using high intensity red, green and blue light emitting diodes" by G. Harbers and C. Hoelen, SID Digest, LP-2, p. 702 (2001).

International Search Report of Application PCT/IL04/00446 Dated Dec. 8, 2004.

CN Office Action of Application No. 200480014431.8 Dated Aug. 17, 2007.

International Search Report for International Application No. PCT/IL03/00307 mailed Sep. 11, 2003.

\* cited by examiner

MULTI-PRIMARY DISPLAY WITH SPECTRALLY ADAPTED BACK-ILLUMINATION

CROSS-REFERENCE TO RELATED APPLICATIONS

This Application is a National Phase Application of International Application No. PCT/IL2004/000446, International Filing Date May 24, 2004, which claims priority of U.S. Provisional Patent Application, 60/473,135, filed May 27, 2003; and a Continuation In Part of U.S. patent application 10/480,280, filed Dec. 11, 2003 now U.S. Pat. No 7,268,757, as a National Phase Application of International Application No. PCT/IL02/000452, International Filing Date Jun. 11, 2002, which claims priority of U.S. Provisional Patent Application, 60/296,767, filed Jun. 11, 2001, of U.S. Provisional Patent Application, 60/318,626, filed Sep. 13, 2001, and of U.S. Provisional Patent Application, 60/371,419, filed Apr. 11, 2002, the entire disclosures of all of which are incorporated herein by reference.

FIELD OF THE INVENTION

The invention relates generally to color display devices, systems and methods and, more particularly, to display devices, systems and methods having improved color image reproduction capability.

BACKGROUND OF THE INVENTION

Figure 1:
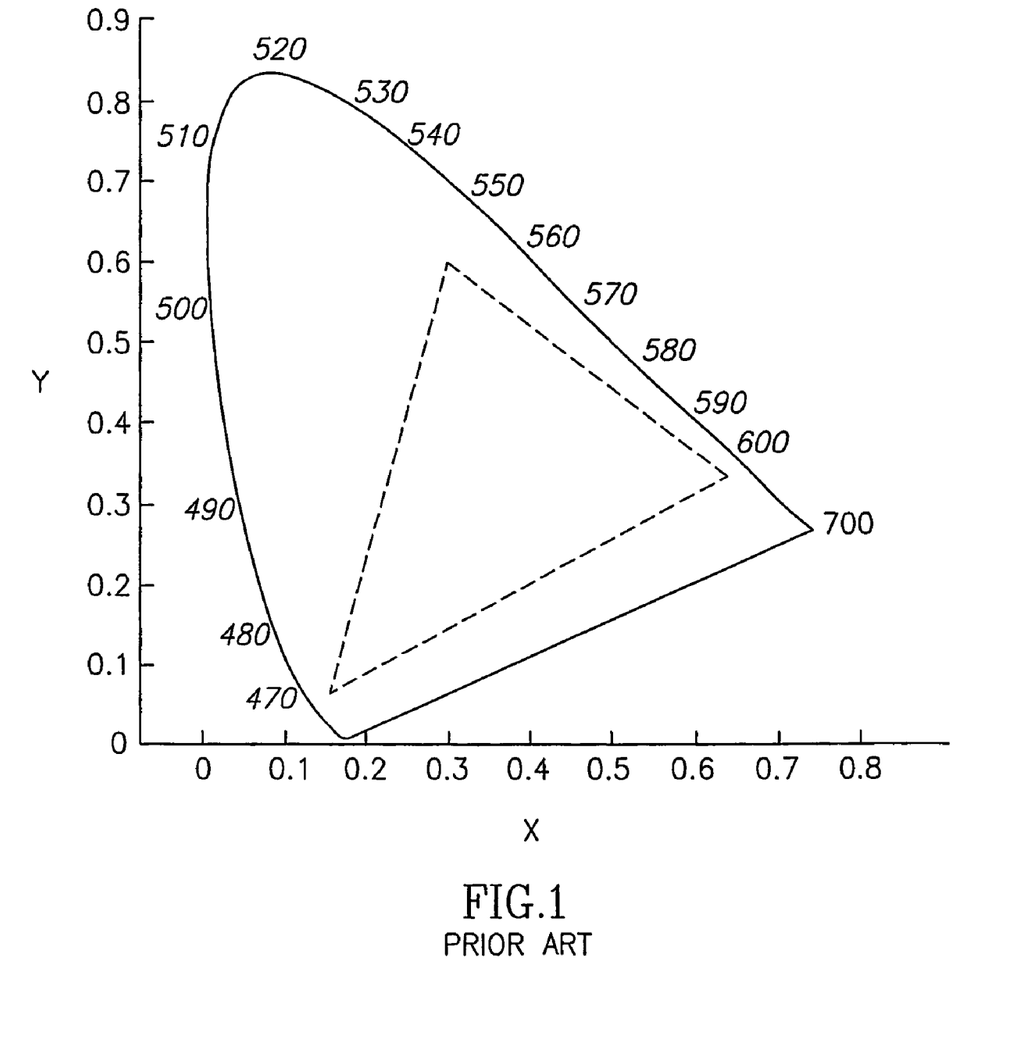
FIG. 1 is a schematic illustration of a chromaticity diagram representing a prior art RGB color gamut, superimposed with a chromaticity diagram of the color gamut of a human vision system, as is known in the art.

Standard computer monitors and TV displays are typically based on reproduction of three, additive, primary colors ("primaries"), for example, red, green, and blue, collectively referred to as RGB. Unfortunately, these monitors cannot display many colors perceived by humans, since they are limited in the range of color they are capable of displaying. FIG. 1 schematically illustrates a chromaticity diagram as is known in the art. The closed area in the shape of a horseshoe represents the chromaticity range of colors that can be seen by humans. However, chromaticity alone does not fully represent all visible color variations. For example, each chromaticity value on the two-dimensional chromaticity plane of FIG. 1 may be reproduced at various different brightness levels. Thus, a full representation of the visible color space requires a three dimensional space including, for example, two coordinates representing chromaticity and a third coordinate representing brightness. Other three dimensional space representations may also be defined. The points at the border of the horseshoe diagram in FIG. 1, commonly referred to as "spectrum locus", correspond to monochromatic excitations at wavelengths ranging, for example, from 400 nm to 780 nm. The straight line "closing" the bottom of the horseshoe, between the extreme monochromatic excitation at the longest and shortest wavelengths, is commonly referred to as "the purple line". The range of colors discernible by the human eye, represented by the area of the horseshoe diagram above the purple line, at varying brightness levels, is commonly referred to as the color gamut of the eye. The dotted triangular area of FIG. 1 represents the range of colors that are reproducible by a standard RGB monitor.

Figure 2A:
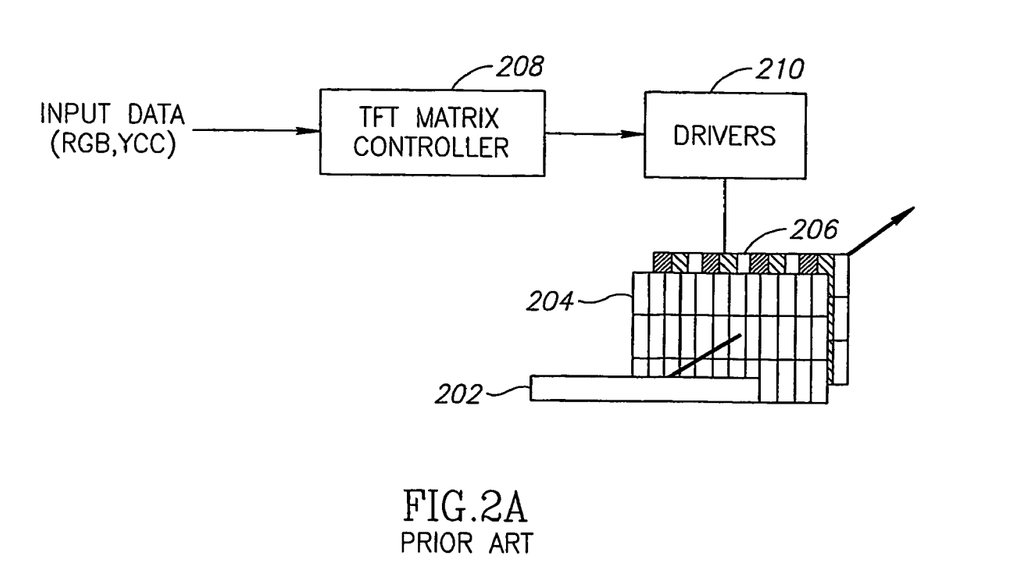
FIG. 2A is a schematic block diagram illustrating a prior art 3-primary LCD system.

There are many known types of RGB monitors, using various display technologies, including but not limited to CRT, Light Emitting Diode (LED), plasma, projection displays, LCD devices and others. Over the past few years, the use of color LCD devices has been increasing steadily. A typical color LCD device is schematically illustrated in FIG. 2A. Such a device includes a light source 202, an array of liquid crystal (LC) elements (cells) 204, for example, an LC array using Thin Film Transistor (TFT) active-matrix technology, as is known in the art. The device further includes electronic circuits 210 for driving the LC array cells, e.g., by active-matrix addressing, as is known in the art, and a tri-color filter array, e.g., a RGB filter array 206, juxtaposed the LC array. In existing LCD devices, each full-color pixel of the displayed image is reproduced by three sub-pixels, each sub-pixel corresponding to a different primary color, e.g., each pixel is reproduced by driving a respective set of R, G and B sub-pixels. For each sub-pixel there is a corresponding cell in the LC array. Back-illumination source 202 provides the light needed to produce the color images. The transmittance of each of the sub-pixels is controlled by the voltage applied to the corresponding LC cell, based on the RGB data input for the corresponding pixel. A controller 208 receives the input RGB data, scales it to the required size and resolution, and transmits data representing the magnitude of the signal to be delivered by the different drivers based on the input data for each pixel. The intensity of white light provided by the back-illumination source is spatially modulated by the LC array, selectively attenuating the light for each sub pixel according to the desired intensity of the sub-pixel. The selectively attenuated light passes through the RGB color filter array, wherein each LC cell is in registry with a corresponding color sub-pixel, producing the desired color sub-pixel combinations. The human vision system spatially integrates the light filtered through the different color sub-pixels to perceive a color image.

LCDs are used in various applications. LCDs are particularly common in portable devices, for example, the small size displays of PDA devices, game consoles and mobile telephones, and the medium size displays of laptop ("notebook") computers. These applications require thin and miniaturized designs and low power consumption. However, LCD technology is also used in non-portable devices, generally requiring larger display sizes, for example, desktop computer displays and TV sets. Different LCD applications may require different LCD designs to achieve optimal results. The more "traditional" markets for LCD devices, e.g., the markets of battery-operated devices (e.g., PDA, cellular phones and laptop computers) require LCDs with high brightness efficiency, which leads to reduced power consumption. In desktop computer displays, high resolution, image quality and color richness are the primary considerations, and low power consumption is only a secondary consideration. Laptop computer displays require both high resolution and low power consumption; however, picture quality and color richness are compromised in many such devices. In TV display applications, picture quality and color richness are generally the most important considerations; power consumption and high resolution are secondary considerations in such devices.

Figure 3A:
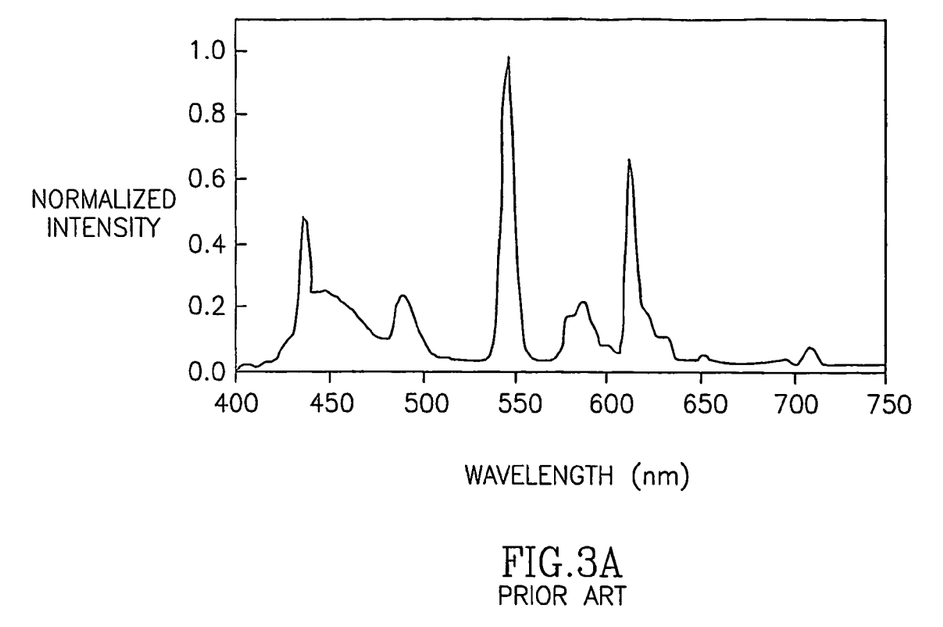
FIG. 3A is a schematic graph illustrating typical spectra of a prior art Cold Cathode Fluorescent Light (CCFL) source.

Typically, the light source providing back-illumination to LCD devices is a Cold Cathode Fluorescent Light (CCFL). FIG. 3A schematically illustrates typical spectra of a CCFL, as is known in the art. As illustrated in FIG. 3A, the light source spectra include three, relatively narrow, dominant wavelength ranges, corresponding to red, green and blue light, respectively. Other suitable light sources, as are known in the art, may alternatively be used. The RGB filters in the filter sub-pixel array may be designed to reproduced a wide color gamut (e.g., as close as possible to the color gamut of a corresponding CRT monitor), but also to maximize the display efficiency, e.g., by selecting filters whose transmission curves generally overlap the CCFL spectra peaks in FIG. 3A. In general, for a given source brightness, filters with narrower transmission spectra provide a wider color gamut but a reduced display brightness, and vice versa. For example, in applications where power efficiency is a critical consideration, color gamut width may often be sacrificed. In certain TV applications, brightness is an important consideration; however, dull colors are not acceptable.

Figure 4A:
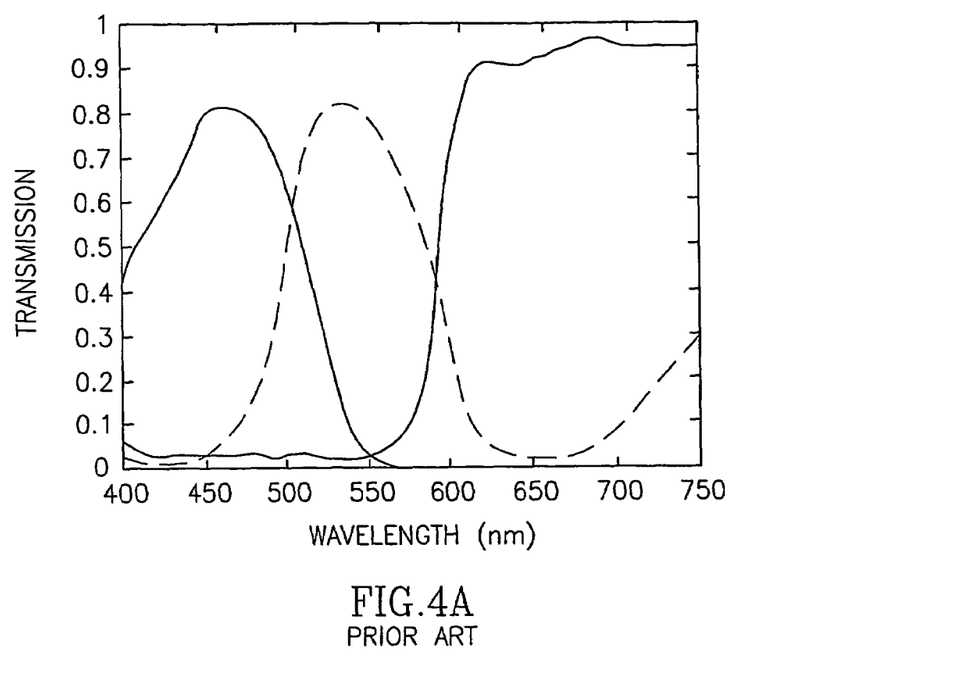
FIG. 4A is a schematic graph illustrating a typical RGB filter spectra of a prior art laptop computer display.
Figure 4B:
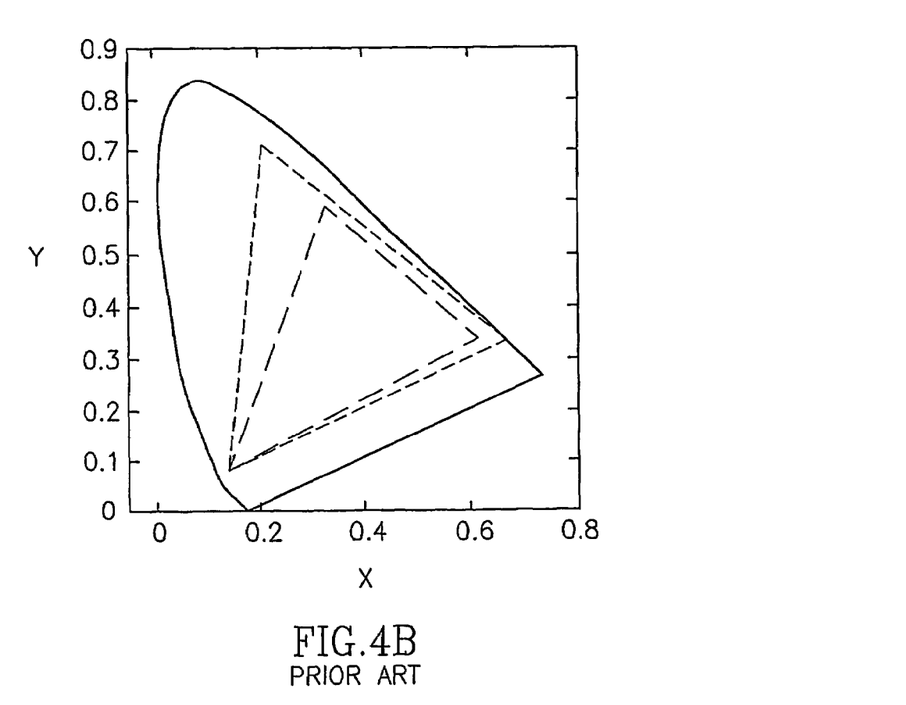
FIG. 4B is a schematic illustration of a chromaticity diagram representing the color gamut reproduced by the RGB filter spectra of FIG. 4A, superimposed with an ideal prior art NTSC color gamut.

FIG. 4A schematically illustrates typical RGB filter spectra of existing laptop computer displays. FIG. 4B schematically illustrates a chromaticity diagram representing the reproducible color gamut of the typical laptop spectra (dashed-triangular area in FIG. 4B), as compared with an ideal NTSC color gamut (dotted triangular area in FIG. 4B). As shown in FIG. 4B, the NTSC color gamut is significantly wider than the color gamut of the typical laptop computer display and therefore, many color combinations included in the NTSC gamut are not reproducible by the typical color laptop computer display.

A LCD display using three color LED backlighting is described in "High performance LCD backlighting using high intensity red, green and blue light emitting diodes" by G. Harbers and C Hoelen, SID Digest, LP-2, page 702 (2001).

SUMMARY OF EMBODIMENTS OF THE INVENTION

Many colors seen by humans are not discernible on standard red-green-blue (RGB) monitors. By using a display device with more than tree primary colors, the reproducible color gamut of the display is expanded. Additionally or alternatively, the brightness level produced by the display may be significantly increased. Embodiments of the present invention provide systems and methods of displaying color images on a display device, for example, a thin profile display device, such as a liquid crystal display (LCD) device, using more than three primary colors.

Exemplary embodiments of the invention provide improved multi-primary display devices using more than three sub-pixels of different colors to create each pixel. In embodiments of this aspect of the invention, the use of a back-illumination source including an array of at least four light producing elements, e.g., Light Emitting Diodes (LEDs), having at least four different colors, and the use of four or more different color sub-pixels, per pixel, allows for a wider color gamut and/or higher luminous efficiency. In some embodiments, the number and/or spectra of the LEDs, the number of sub-pixels per pixel, and/or the color spectra of the different sub-pixels may be optimized to obtain a desired combination of a sufficiently wide color gamut and/or sufficiently high brightness.

In some embodiments of the invention, the use of more than three primary colors may expand the reproducible color gamut of the display by enabling the use of relatively narrow wavelength ranges for some of the primary colors, e.g., red, green and blue, thus increasing the saturation of those primary colors. To compensate for a potentially reduced brightness level from such narrower ranges, in some embodiments of the invention, broad wavelength range primary colors, e.g., specifically designed yellow and/or cyan, may be used in addition to the narrow wavelength range colors, thus increasing the overall brightness of the display.

According to embodiments of the invention, the light emitted by each single LED in the LED array may have a predefined, narrow, wavelength spectrum corresponding to a desired color. For example, in some exemplary embodiments of the invention, different LEDs in the LED array may emit two spectra of blue, a cyan spectrum, a green spectrum, a yellow spectrum, and two red spectra. According to some embodiments of the invention, a combination of LEDs having different wavelength spectra may be used to produce any desired wavelength spectral combination. A wavelength spectra combination provided by a combination of LEDs in accordance with embodiments of the invention may span a wider range of relevant colors compared to the light spectrum provided by a Cold Cathode Fluorescent Light (CCFL). Further, the wavelength spectral combination provided by a combination of LEDs according to embodiments of the invention may yield improved separation of wavelengths compared to the light spectrum provided by a CCFL. Using a LED array according to embodiments of the invention as a back-illumination source may enable reproduction of colors corresponding to a set of pre-selected narrow wavelength spectra. Therefore, when used in conjunction with appropriate color filer combinations, as described below, the LED back-illumination according to embodiments of the invention may enable more refined control in reproducing a desired color gamut and/or brightness levels.

According to some embodiments of the invention the number of different color LEDs, m, may be higher than the number of primary colors, n. According to these embodiments, the aggregated illumination from two or more different color LEDs may be substantially equivalent, for viewing purposes, to a given primary color. Thus, embodiments of the invention enable reproduction of any desired primary color, for example, a certain shade of blue, which may not be readily reproduced by a single LED, for example, due to unavailability or inefficiency of LEDs of certain wavelengths.

The color gamut and other attributes of a more-than-three primary color LCD device in accordance with embodiments of the invention may be controlled by controlling the combination of the LEDs back-illumination as well as the spectral transmission characteristics of the different primary color sub-pixel filter elements used by the device. Selection of LED combinations and primary color sub-pixel filter elements for a more-than-three primary color LCD device in accordance with the invention may be based on various criteria, for example, establishing sufficient coverage of a desired color gamut, maximizing the brightness level that may be produced by the display, and/or adjusting the relative intensities of the primary colors according to a desired chromaticity standard.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF EMBODIMENTS OF THE INVENTION

In the following description, various aspects of the invention are described, with reference to specific embodiments that provide a thorough understanding of the invention; however, it will be apparent to one skilled in the art that the present invention is not limited to the specific embodiments and examples described herein Further, to the extent that certain details of the devices, systems and methods described herein are related to known aspects of color display devices, systems and methods, such details may have been omitted or simplified for clarity.

Embodiments of monitors and display devices with more than three primaries, in accordance with exemplary embodiments of the invention, are described in International Application PCT/IL02/00452, filed Jun. 11, 2002, entitled "Device, System and Method For Color Display" and published Dec. 19, 2002 as PCT Publication WO02/101644, and in International Application PCT/IL03/00307, filed Apr. 13, 2003, entitled "Color Display Devices and Methods with Enhanced Attributes", and published Oct. 23, 2003 as PCT publication WO03/088203, the disclosures of all of which applications and publications are incorporated herein by reference.

While, in embodiments of the present invention, methods and systems disclosed in the above referenced patent applications may be used, for example, methods of converting source data to primary data, or methods of creating primary color materials or filters; in alternate embodiments, the system and method of the present invention may be used with any other suitable n-primary display technology using m light-producing element, e.g., Light Emitting Diodes (LEDs), as a back-illumination source, wherein n is equal to or greater than four and m is equal to or greater than three. Certain embodiments described in these applications are based on rear or front projection devices, LCD devices, or other types of display devices. While the following description focuses mainly on n-primaries flat panel display devices using an array of LEDs as a back-illumination source in accordance with exemplary embodiments of the invention, it should be appreciated that, in alternate embodiments, the systems, methods and devices of the present invention may also be used in conjunction with other types of display and modulation techniques. For example, the systems, methods and/or devices of the present invention may be used in conjunction with n-primary projection display devices, e.g., as described in International Application PCT/IL01/00527, filed Jun. 7, 2001, entitled "Device, System and Method For Electronic True Color Display", and published as PCT publication WO 01/95544, the disclosures of which is incorporated herein by reference.

Figure 2B:
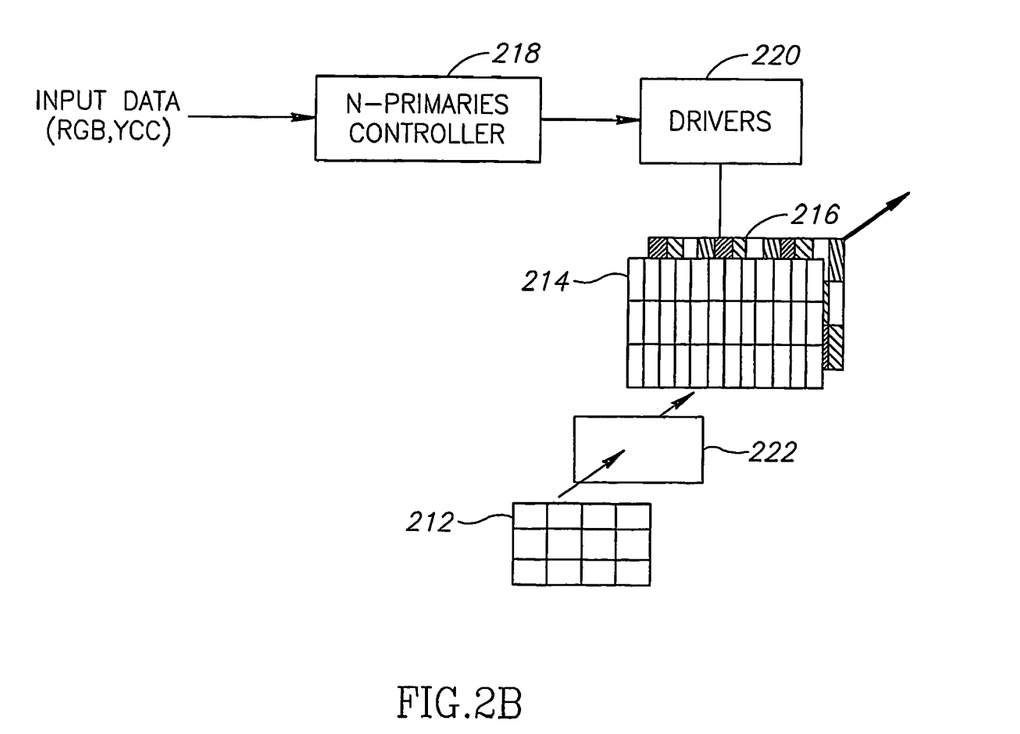
FIG. 2B is a schematic block diagram illustrating an n-primary LCD system with Light Emitting Diode (LED) back-illumination in accordance with an embodiment of the invention.

FIG. 2B schematically illustrates a more-than-three primary color display system in accordance with an embodiment of the invention. The system may include a back-illumination source including an array of light-producing elements, e.g., LEDs 212 including a LED combination of m different color LEDs, wherein m is equal to or greater than three. The system may additionally include a light-guiding optics unit 222, which may include, for example, a diffuser and/or one or more optical elements, e.g., light-guides, lenses and/or mirrors, or any other element to provide uniform back-illumination from LEDs 212, as is known in the art. According to some exemplary embodiments of the invention, LEDs may be activated simultaneously to produce aggregated light including m different wavelength spectra, as described below. The system may also include an array of liquid crystal (LC) elements (cells) 214, for example, an LC array using Thin Film Transistor (TFT) active-matrix technology, as is known in the art. The device further includes electronic circuits 220 for driving the LC array cells, e.g., by active-matrix addressing, as is known in the art, and an n-primary color filter array 216, including n different color sub-pixel filters, wherein n is greater than three, juxtaposed the LC array.

In some embodiments of the invention, the number of different color LEDs, m, may be equal to the number of primary colors, n. In these embodiments, each of the m color LEDs and a corresponding color sub-pixel filter element may have the same narrow spectrum, which may substantially correspond to one of the n primary colors, as described below.

In other embodiments of the invention, the number of different color LEDs, m, may be greater than the number of primary colors, n. According to these embodiments, two or more different color LEDs may be utilized to provide an aggregated illumination corresponding to one primary color. This may provide back-illumination effectively equivalent to a desired primary color, for example, a specific shade of blue, whose wavelength range may not be readily produced by a single type of LED, for example, due to unavailability or inefficiency of LEDs of certain wavelengths. In these embodiments, the narrow emission spectra of two or more of the m color LEDs, which may cover slightly different ranges in spectra vicinity of the desired primary color, may all be included in the transmission spectrum of one of the n color filters, as described below.

In exemplary embodiments of the LCD devices of the invention, each full-color pixel of the displayed image is reproduced by more than three sub-pixels, each sub-pixel corresponding to a different primary color, e.g., each pixel is reproduced by driving a corresponding set of four or more sub-pixels. For each sub-pixel there is a corresponding cell in LC array 214. LED array 212 provides the light needed to produce the color images. Light-guiding optics unit 222 combines and conforms the different light spectrums emitted by each of the LEDs of LED array 212 to provide substantially uniform, substantially white-light, aggregated illumination on LC array 214, in accordance with the combined spectra of LEDS 212. The LEDs may be arranged in the LED array in an arrangement that provides a substantially uniform color distribution, and an aggregated light having a substantially uniform degree of brightness. For example, the LEDs may be arranged in an arrangement that minimizes the variance in distance between each color LED and the closest LEDs of all other colors. The transmittance of each of the sub-pixels is controlled by the voltage applied to a corresponding LC cell of array 214, based on the image data input for the corresponding pixel. An n-primaries controller 218 receives the input data, e.g., in RGB or YCC format, optionally scales the data to a desired size and resolution, and transmits data representing the magnitude of the signals to be delivered by the different drivers based on the input data for each pixel. The intensity of the aggregated perceived-white illumination provided by light-guiding optics unit 222 may be spatially modulated by elements of the LC array, which selectively controls the illumination of each sub-pixel according to the image data for the sub-pixel. The selectively attenuated light of each sub-pixel passes through a corresponding color filter of color filter array 216, thereby producing desired color sub-pixel combinations. The human vision system spatially integrates the light filtered through the different color sub-pixels to perceive a color image.

The color gamut and other attributes of LCD devices in accordance with embodiments of the invention may be controlled by a number of parameters. These parameters may include the spectra and efficiency of LEDs 212, the spectral transmission of the LC cells in the LC array, and the spectral transmission of the color filters. According to embodiments of the invention, LEDs 212 and/or color filters 216 may be selected to provide a desired level of each of these parameters, as described below.

Figure 3B:
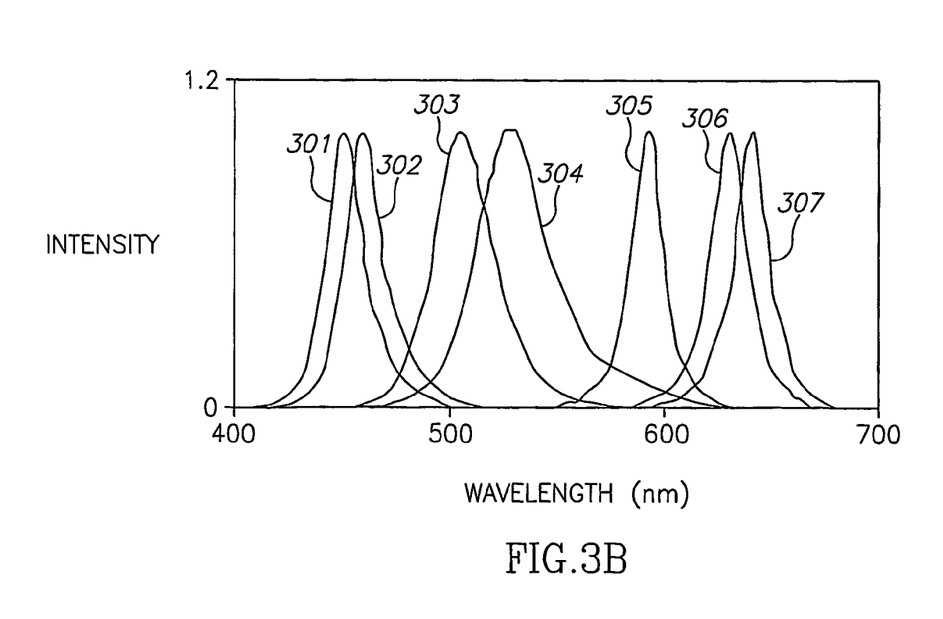
FIG. 3B is a schematic graph illustrating normalized spectra of a set of seven LEDs which may be used as a back-illumination source, in accordance with exemplary embodiments of the invention.

FIG. 3B is a schematic illustrates a graph of normalized spectra of a set of seven LEDs, for example, the Luxeon™ Emitter Blue, Royal Blue, Cyan, Green, Amber, Red-Orange and Red LEDs, available from Lumileds Lighting Ltd, USA, in accordance with an exemplary embodiment of the invention.

Figure 3C:
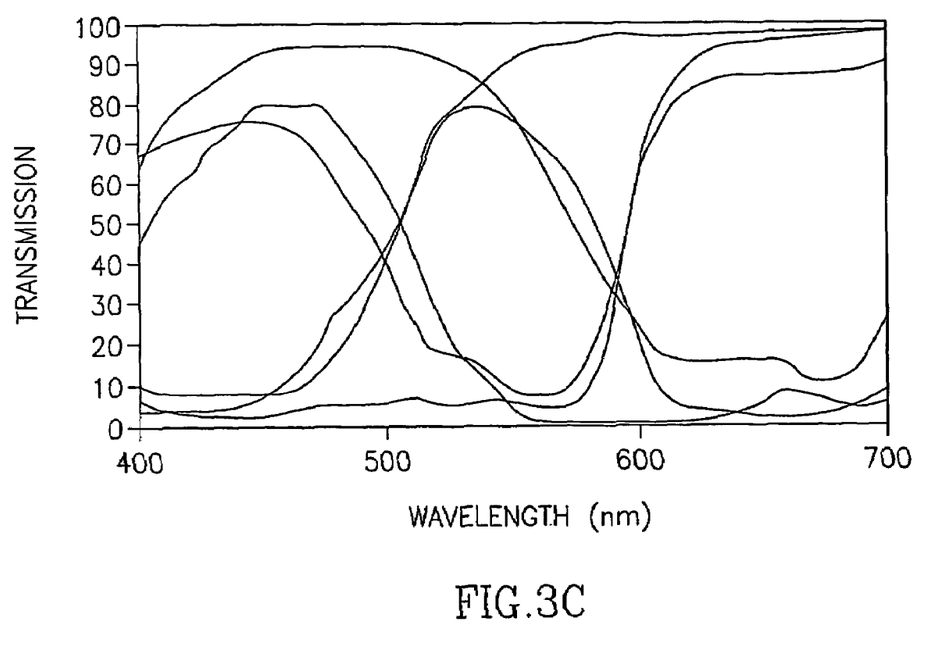
FIG. 3C is a schematic graph illustrating transmision curves of a six-primary filter array, in accordance with an exemplary embodiment of the invention.

According to embodiments of the invention, the light emitted by each single LED in LED array 212 may have a pre-defined narrow light spectrum corresponding with a pre-defined wavelength as illustrated in FIG. 3B. For example, LED spectra 301 to 307 correspond to wavelengths of two spectra of blue, a cyan spectrum, a green spectrum, a yellow spectrum, and two red spectra, respectively. According to some embodiments of the invention, a combination of LEDs having different wavelength spectra may be used to produce any desired wavelength spectra combination. A wavelength spectra combination provided by a combination of LEDs may include a wider range of relevant wavelengths corresponding to a wider range of colors, as illustrated, for example, in FIG. 3B, in comparison to the light spectrum provided by a CCFL, as illustrated, for example, in FIG. 3A. A wavelength spectra combination provided by a combination of LEDs according to embodiments of the invention may further include improved separation of wavelengths compared to the light spectrum provided by a CCFL. Therefore, using LED array 212 (FIG. 2B) as a back-illumination source, in accordance with an embodiment of the invention, may enable production of a spectra combination corresponding to a set of pre-selected narrow wavelength spectra. Thus, when used in conjunction with a corresponding array of color filers 216 (FIG. 2B), LED array 212 (FIG. 2B) may enable more refined control in reproducing a desired color gamut and/or brightness levels, as described in detail below. FIG. 3C schematically illustrates transmition curves of a six-primary filter array in accordance with an exemplary embodiment of the invention. According to embodiments of the invention, filter array 216 (FIG. 2B) may be used in conjunction with LED array 212 in order to provide a set of sub-pixels each corresponding to a different required primary color as described in detail below.

For a multi-primary display with more than three primary colors, in accordance with embodiments of the invention, an infinite number of LEDs and/or filter combinations may be selected to substantially overlap a required color gamut. Therefore, the LED and/or filter selection method of the invention may include optimizing the LED and/or filter selection according to at least one of the following requirements: establishing sufficient coverage of a desired two-dimensional color gamut, for example, the NTSC standard gamut (e.g., for wide-gamut applications) and/or a "conventional" 3-color LCD gamut (e.g., for higher brightness applications); maximizing the brightness level of a balanced white point that can be obtained from combining all the primary colors; and adjusting the relative intensities of the primary colors in accordance with a desired illumination standard, e.g., the D65 white point chromaticity standard of High Definition TV (HDTV) systems.

Embodiments of the present invention provide systems and methods of displaying color images on a display device, for example, a thin profile display device, such as a liquid crystal display (LCD) device, using an array of LEDs producing a plurality of m different wavelengths as a back-illumination source, and an array of filters providing a plurality of n primary colors, wherein m is equal to or greater than three and n is greater than three. This arrangement has several advantages in comparison, for example, to display devices using a back-illumination source including only three RGB LEDs. First, the n-primary display device including an array of m color LEDs as a backlight element, in accordance with the invention, enables expansion of the color gamut covered by the display, as described below. Second, a better match between the spectra of the LEDs and the spectra of the filters may be achieved, as described below. In this case, a maximum level of light emitted from each of the LEDs may be efficiently transferred through a corresponding color filter. Thus, the device in accordance with the invention enables a significant increase in the luminous efficiency of the display in comparison, for example, with a display using a RGB LED back-illumination source covering a similar color gamut. This feature of the invention is particularly advantageous for portable (e.g., battery-operated) display devices, because increased luminous efficiency may extend the usable time of a battery after each recharging and/or reduce the overall weight of the device by using a lighter battery.

In some multi-primary display devices in accordance with embodiments of the invention, more than three sub-pixels of different colors are used to create each pixel. In embodiments of the invention, the use of more than three different color sub-pixels, per pixel, allows for a wider color gamut and/or higher luminous efficiency. In some embodiments, the number of sub-pixels per pixel; the number and wavelength spectrum of each one of the LEDs in the LED array; and the transmittance spectrum of the different sub-pixel filters may be optimized to obtain a desired combination of a sufficiently wide color gamut and/or sufficiently high brightness, as described below.

For example, the use of an array of LEDs as a back-illumination source combined with the use of more than three primary color filters, in accordance with an embodiment of the invention, may enable expansion of the reproducible color gamut by enabling the use of filters with narrower transmission curves (e.g., narrower effective transmission ranges) for the R, G and B color filters and, thus, increasing the saturation of the R, G and B sub-pixels. To compensate for such narrower ranges, in some embodiments of the invention, broader wavelength spectrum sub-pixel filters may be used in addition to the RGB saturated colors, thus increasing the overall brightness of the display. The use of the array of LEDs as a back-illumination source, in accordance with embodiments of the invention, may allow more efficient use, as described above, of the color filter attributes to enable a wider gamut and/or a higher brightness level. In accordance with embodiments of the invention, an optimal combination of color gamut width and over-all picture brightness may be achieved, to meet the requirements of a given system, by appropriately selecting the LEDs and color filters. According to some of these embodiments, the selection may include at least two different color LEDs corresponding to one color filter in order to provide substantially one primary color. These LEDs and color filter may be selected such that the combined wavelengths of the two or more LEDs produce a viewed color effectively corresponding to a desired primary color. The transmission spectrum of the corresponding color filter may be designed to accommodate the wavelengths of the two or more LEDs.

Figure 5:
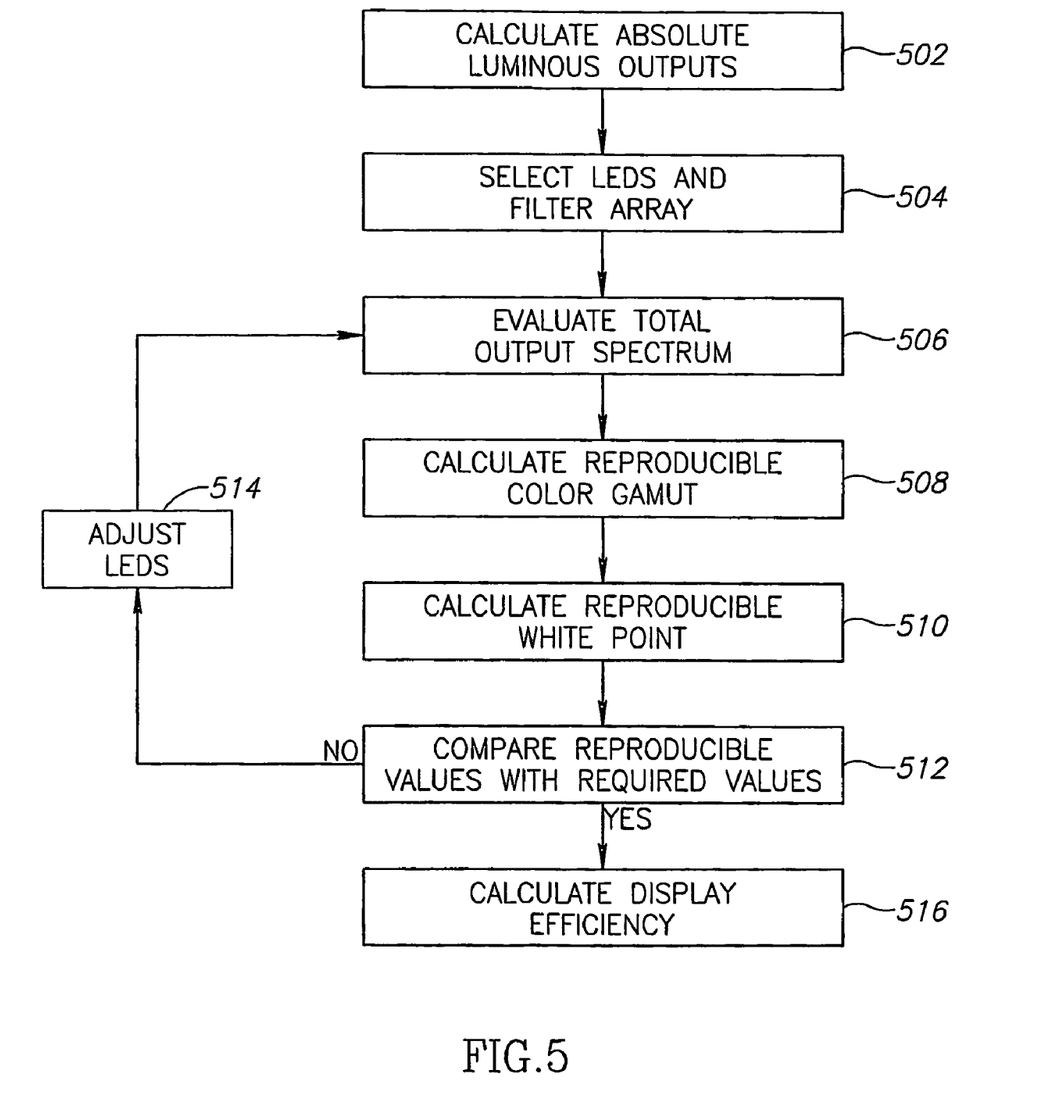
FIG. 5 is a schematic block-diagram illustration of a method for selecting a LED array and filter array, in accordance with exemplary embodiments of the invention.

Reference is now made to FIG. 5, which schematically illustrates a block-diagram of a trial and error method for selecting a LED array and filter array, in accordance with exemplary embodiments of the invention.

According to embodiments of the invention, the LED array may include a plurality of, e.g., $l_m$, LEDs of each of m different LED colors. The LEDs may be located in the array in an arrangement that provides substantially uniform aggregated illumination of substantially white light According to these embodiments, the trial and error method of FIG. 5 may be used for selecting an optimal number of LEDs of each color, $l_m$, and an optimal selection and arrangement of filter elements in the array of filters used in conjunction with the LEDs to achieve desired display attributes, for example, a desired color gamut and/or white point.

According to embodiments of the invention, the method of FIG. 5 may include calculating an absolute luminous spectral output, $s_m$, for each of the LED colors, as indicated at block 502. This may be performed, for example, using LED specification, e.g., normalized spectra and output (e.g., in Lumens) per unit of supplied electric power (e.g., Watt), and assuming each of the LEDs is supplied with substantially equal electrical power (Watt).

The method may also include selecting a combination of LEDs including $l_m$ LEDs of each different color, m, and a compatible array of filter elements, as indicated at block 504.

As indicated at block 506, a total output spectrum, $T_s$, of the LED array may be evaluated, e.g., by the following equation:

$$T_s = \sum_m \left( \frac{l_m}{\sum_m l_m} s_m \right) \quad (1)$$

As indicated at block 508, a color point of each of the primary colors may be calculated, e.g., using $T_s$ and the filter array transmission spectra. The calculated color points may be used to define a corresponding color gamut that may be reproduced using these parameters.

As indicated at block 510, a reproducible white point spectrum and reproducible white color coordinates may be calculated, e.g., as known in the art.

As indicated at block 512, the reproducible white point spectrum and coordinates and the reproducible color gamut may be compared with the required color gamut and the required white point spectrum and coordinates, respectively.

If the reproducible values substantially differ from the required values of block 512, the method may include returning to block 506 after adjusting the entry of lm accordingly. For example, if the reproducible light spectrum is "too blue", the number of blue LEDs may be reduced and/or the number of yellow LEDs may be increased, as indicated at block 514.

If the reproducible values substantially match the required values, the method may include calculating the display efficiency, $D_{eff}$, as indicated at block 516.

Figure 6A:
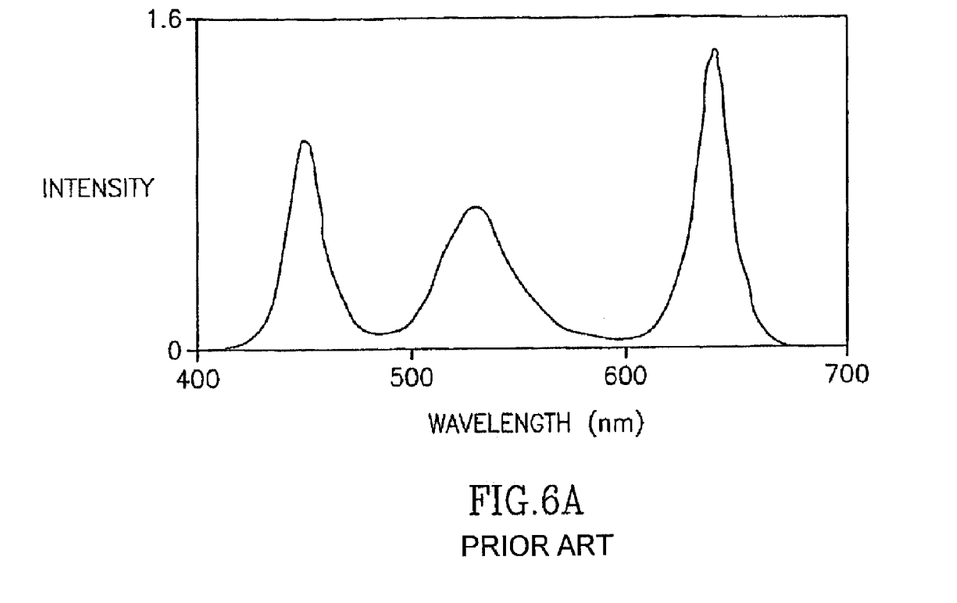
FIG. 6A is a schematic graph illustrating a spectrum of a prior art back-illumination source including a LED combination of a blue LED, a green LED and a red LED.
Figure 6B:
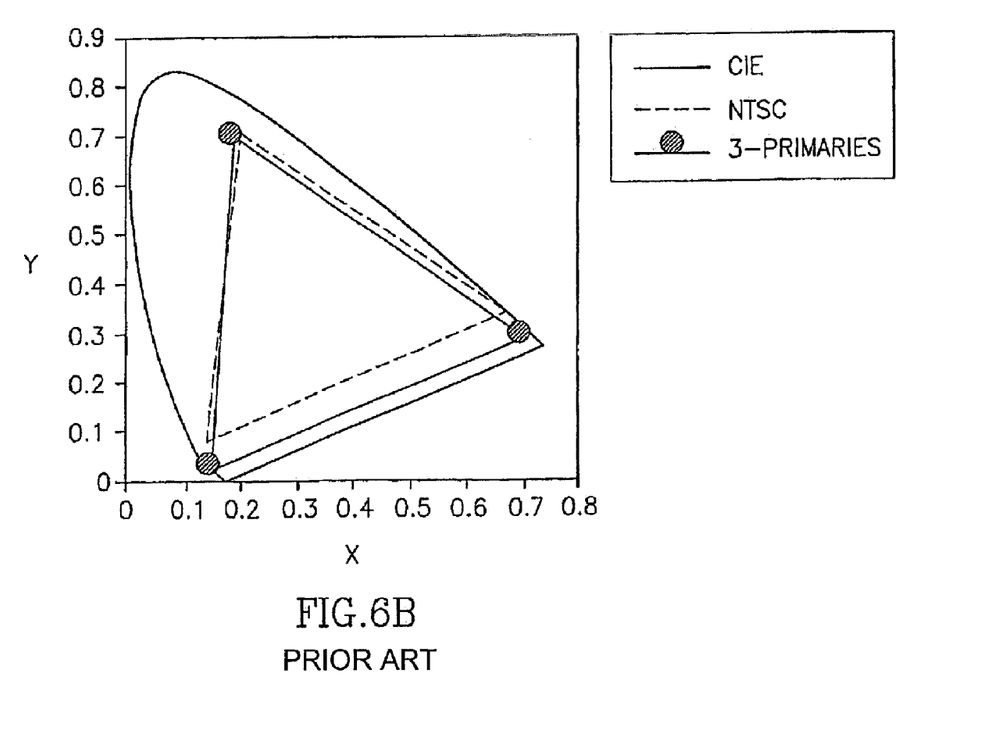
FIG. 6B is a schematic illustration of a chromaticity diagram representing a color gamut reproduced by the LED combination of FIG. 6A.

FIG. 6A schematically illustrates an effective spectrum of a prior art back-illumination source including a combination of blue, green and red LEDs, having wavelength spectra 301, 304 and 307 (FIG. 3B), respectively. The LED combination of FIG. 6A, may be used to provide a color gamut as illustrated schematically in FIG. 6B.

Figure 7A:
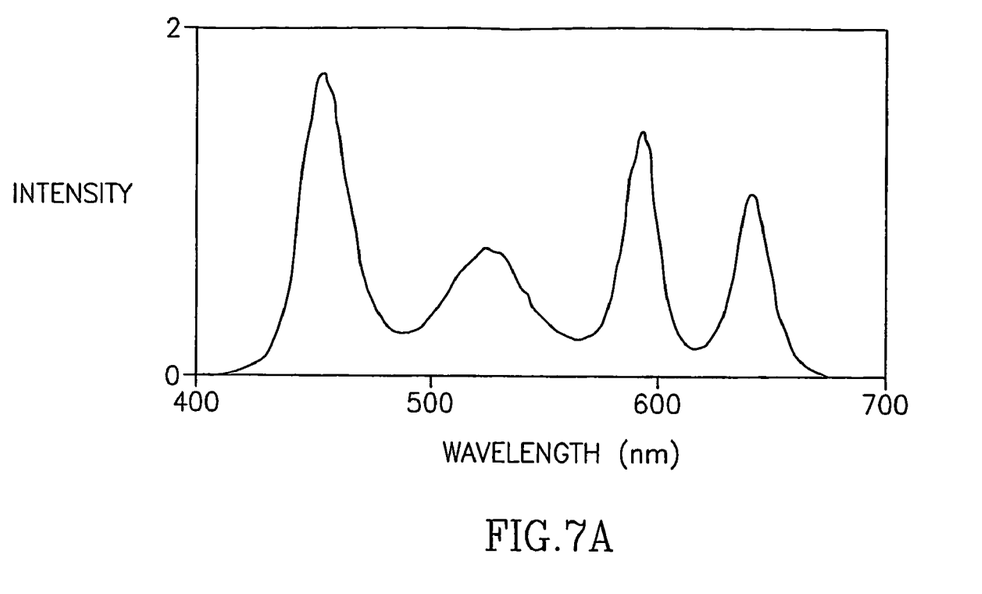
FIG. 7A is a schematic graph illustrating a spectrum of a back-illumination source including a LED combination of six LEDs in accordance with exemplary embodiments of the invention.

FIG. 7A is a schematic illustration of a combined spectrum of a back-illumination source having a combination of LEDs including two shades of blue LEDs, a cyan LED, a green LED, a yellow LED, and a red spectrum LED, having wavelength spectra 301, 302, 303, 304, 305 and 307 (FIG. 3B), respectively, in accordance with exemplary embodiments of the invention.

Figure 7B:
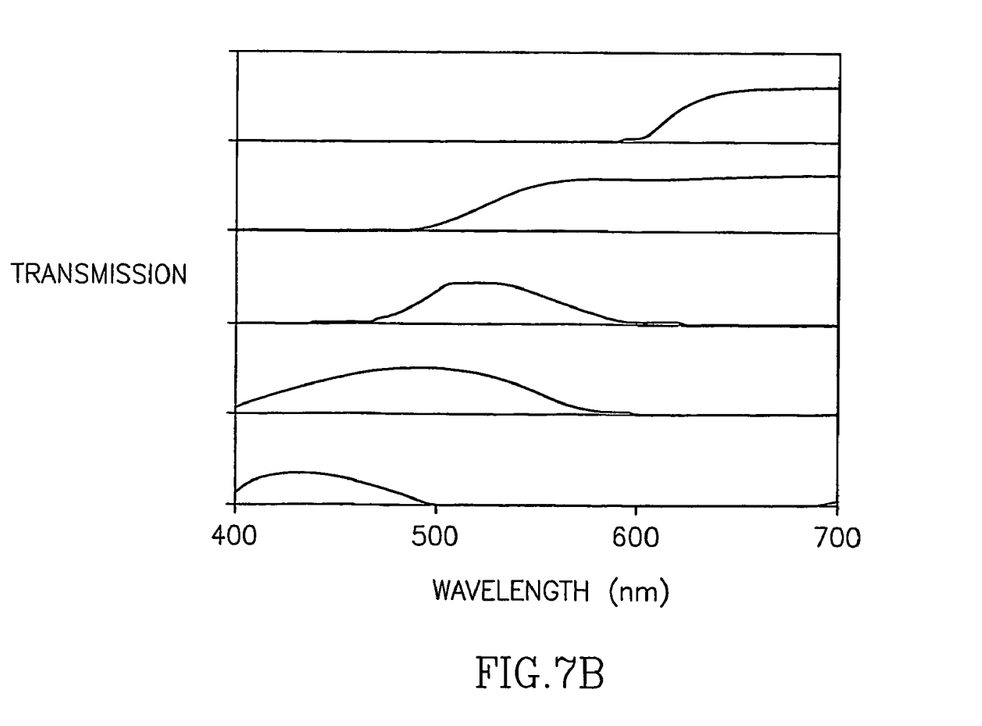
FIG. 7B is a schematic graph illustrating transmision curves of a filter array used in conjunction with the LED combination of FIG. 7A to provide a five-primary display, in accordance with an exemplary embodiment of the invention.
Figure 7C:
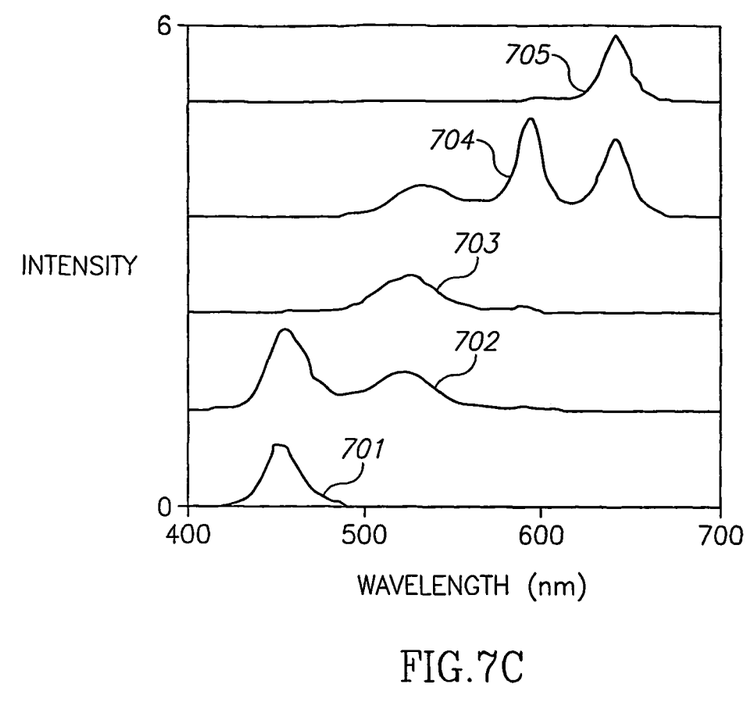
FIG. 7C is a schematically graph illustrating a sub-pixel spectrum of five RGBCY primaries obtained by the LED combination of FIG. 7A in conjunction with the filter array of FIG. 7B.

FIG. 7B is a schematic graph illustrating transmition curves of a filter array used in conjunction with the LED combination of FIG. 7A to provide a five-primary display, in accordance with an exemplary embodiment of the invention; In accordance with an embodiment of the invention, the LED combination of FIG. 7A may be used in conjunction with the filter array of FIG. 7B, to create a five primary RGBCY display. According to embodiments of the invention, the back-illumination of FIG. 7A may be used in conjunction with the filter array of FIG. 7B, to create a sub-pixel spectrum as schematically illustrated in FIG. 7C. The sub-pixel spectrum illustrated in FIG. 7C may include a blue sub-pixel spectrum 701, a cyan sub-pixel spectrum 702, a green sub-pixel spectrum 703, a yellow sub-pixel spectrum 704, and a red sub-pixel spectrum 705.

Figure 7D:
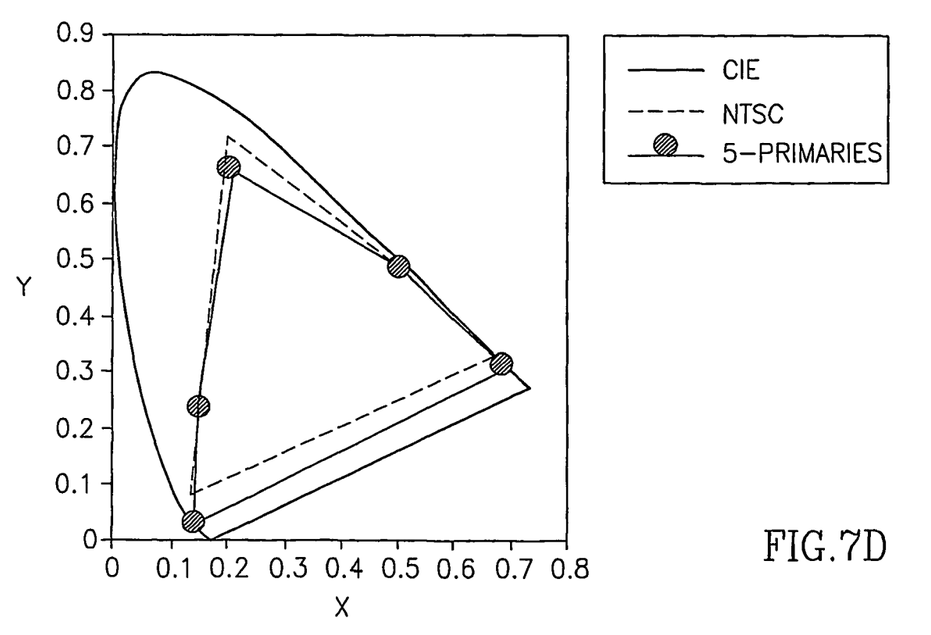
FIG. 7D is a schematic illustration of a chromaticity diagram representing the color gamut reproduced by the LED combination of FIG. 7A in conjunction with the filter array of FIG. 7B.

According to an embodiment of the invention, the LED combination of FIG. 7A in conjunction with the filter array of FIG. 7B, may provide a color gamut as illustrated schematically in FIG. 7D. As known in the art, the normalized over-all brightness level of a conventional 3-color LCD may be calculated as follows:

$$Y(\text{3-colors}) = (Y(\text{color}_1) + Y(\text{color}_2) + Y(\text{color}_3))/3 \quad (2)$$

Analogously, the normalized brightness level of a 5-color LCD device in accordance with an embodiment of the present invention may be calculated as follows:

$$Y(\text{5-colors}) = (Y(\text{color}_1) + Y(\text{color}_2) + Y(\text{color}_3) + Y(\text{color}_4) + Y(\text{color}_5))/5 \quad (3)$$

wherein $Y(\text{color}_i)$ denotes the brightness level of the i'th primary color for a constant input electrical power (e.g., constant current), for example, according to the LEDs manufacturer's specification, and Y(n-colors) denotes the over-all, normalized, brightness level of the n-primaries display.

Each one of the LED elements included in LED array 212 (FIG. 2), according to an embodiment of the invention, may have a narrow wavelength spectrum, as described above. Therefore, the brightness level $Y(\text{color}_i)$ of each individual i'th sub-pixel may be substantially proportional to the intensity I(LED) of the LEDs whose wavelengths are transmitted through the filter element used to reproduce the i'th sub-pixel.

Therefore, a normalized brightness level of a three color RGB LCD with the LED array backlight of FIG. 6A may be calculated as follows:

$$Y(3\ LED) = [I(LED_{red}) + I(LED_{green}) + I(LED_{blue})]/3 \quad ()$$

According to an embodiment of the invention, when the combination illustrated in FIGS. 7A and 7B is used, the cyan filter may fully transmit the blue, cyan and green LEDs, whereas the yellow filter may fully transmit the red and yellow LEDs and partially transmit the green LED. Therefore, the normalized brightness level of a LCD device including the LED combination of FIG. 7A and the filter array of FIG. 7B may be calculated as follows:

$$Y(5LED) = [2*I(LED_{red}) + 2.5*I(LED_{green}) + 2*I(LED_{blue}) + +I(LED_{cyan}) + I(LED_{yellow})]/5 \quad (5)$$

According to exemplary embodiments of the invention, the brightness level of the LED array may be calculated, for example, by substituting the manufacturer's specification values of the LEDs included in the LED array into equation (5). Although, in some embodiments, the color gamut illustrated in FIG. 7D may be comparable to that of the corresponding 3-color LED backlight LCD device of FIG. 6B, the brightness level that can be obtained using the LED combination of FIG. 7A in conjunction with the filter array of FIG. 7B is about 40% higher than that of the corresponding 3-color LED backlight LCD. The higher brightness levels achieved in this embodiment may be attributed, for example, to the addition of yellow (Y) and cyan (C) color sub-pixels, which are specifically designed to have broad transmission regions and, thus, transmit more of the LED-array back-illumination than the RGB filters.

The invention claimed is:

1. A device for displaying a color image comprising:
   an illumination source comprising a plurality of color light sources, each able to produce respective light of each of m different wavelength spectra, wherein m is equal to or greater than three;
   an array of attenuating elements, each able to selectively attenuate the light produced by said plurality of color light sources of said illumination source according to an attenuation pattern corresponding to a gray-level representation of said color image;
   an array of color sub-pixel filter elements able to receive selectively attenuated light from said array of attenuating elements, each sub-pixel filter element able to transmit light of one of n different colors, wherein n is equal to or greater than four; and
   an optics unit to combine said light of said plurality of color light sources to form a substantially uniform illumination of light of said n colors across said array of attenuating elements.

2. The device of claim 1, wherein said array of filter elements is juxtaposed and in registry with said array of attenuating elements such that each color sub-pixel filter element is able to receive light from one of said attenuating elements.

3. The device of claim 1 comprising driving circuitry adapted to receive input data representing said color image and to selectively activate said attenuating elements to produce said attenuation pattern.

4. The device of claim 1, wherein said array of attenuating elements comprises an array of Liquid Crystal (LC) elements.

5. The device of claim 1, wherein at least one of said sub-pixel filter elements is able to fully transmit substantially the entire spectrum of at least two of said m wavelength spectra.

6. The device of claim 1, wherein sub-pixel filter elements of two of said n different colors are able to fully transmit substantially the entire spectrum of at least one of said m wavelength spectra.

7. The device of claim 1, wherein sub-pixel filter elements of a first color of said n different colors are able to transmit light of a first, narrow spectrum, and wherein sub-pixel filter elements of a second color of said n different colors are able to transmit light of a second spectrum broader than and including said narrow spectrum.

8. The device of claim 1, wherein at least one of said n colors is reproducible by a combination of two or more of said m wavelength spectra.

9. The device of claim 1, wherein m equals six.

10. The device of claim 9, wherein said m wavelength spectra comprise two spectra of blue, a cyan spectrum, a green spectrum, a yellow spectrum and a red spectrum.

11. The device of claim 1, wherein said n colors comprise red, green, blue, and yellow.

12. The device of claim 1, wherein n equals five.

13. The device of claim 12, wherein said n colors comprise red, green, blue, cyan and yellow.

14. The device of claim 1, wherein each of said plurality of color light sources comprises one or more light emitting diodes.

15. The device of claim 1, wherein at least one of a number of said color light sources, an arrangement of said color light sources, and one or more of said wavelength spectra is selected based on at least one desired display attribute.

16. The device of claim 15, wherein said at least one display attribute comprises at least one attribute selected from the group consisting of a brightness level, a color gamut, and a relative intensity of said colors.

17. The device of claim 15, wherein the arrangement of said color light sources is selected to provide a substantially spatially uniform distribution of illumination of said m spectra produced by said illumination source.

18. A system for displaying a color image comprising:
   an illumination source comprising a plurality of color light sources, each able to produce respective light of each of m different wavelength spectra, wherein m is equal to or greater than three;

a converter to convert three-primary-color input data representing said color image into converted image data representing said color image in terms of n colors;

an array of attenuating elements, each able to selectively attenuate the light produced by said plurality of color light sources of said illumination source according to an attenuation pattern corresponding to a gray-level representation of said converted image data;

an array of color sub-pixel filter elements able to receive selectively attenuated light from said array of attenuating elements, each sub-pixel filter element able to transmit light of one of n different colors, wherein n is equal to or greater than four; and an optics unit to combine the light of said plurality of color light sources to form substantially uniform illumination of light of said n colors across said array of attenuating elements.

19. The system of claim 18, wherein said array of filter elements is juxtaposed and in registry with said array of attenuating elements such that each color sub-pixel filter element is able to receive light from one of said attenuating elements.

20. The system of claim 18 comprising driving circuitry adapted to receive said converted image data and to selectively activate said attenuating elements to produce said attenuation pattern.

21. The system of claim 18, wherein said array of attenuating elements comprises an array of Liquid Crystal (LC) elements.

22. The system of claim 18, wherein at least one of said sub-pixel filter elements is able to fully transmit substantially the entire spectrum of at least two of said m wavelength spectra.

23. The system of claim 18, wherein sub-pixel filter elements of two of said n different colors are able to fully transmit substantially the entire spectrum of at least one of said m wavelength spectra.

24. The system of claim 18, wherein sub-pixel filter elements of a first color of said n different colors are able to transmit light of a first, narrow spectrum, and wherein sub-pixel filter elements of a second color of said n different colors are able to transmit light of a second spectrum broader than and including said narrow spectrum.

25. The system of claim 18, wherein each of said plurality of color light sources comprises one or more light emitting diodes.

26. The system of claim 18, wherein at least one of a number of said color light sources, an arrangement of said color light sources, and one or more of said wavelength spectra is selected based on at least one desired display attribute.

27. The system of claim 26, wherein said at least one display attribute comprises at least one attribute selected from the group consisting of a brightness level, a color gamut, and a relative intensity of said colors.

28. The system of claim 26, wherein the arrangement of said color light sources is selected to provide a substantially spatially uniform distribution of illumination of said m spectra produced by said illumination source.

* * * * *